June 30, 1970 G. K. McAULIFFE 3,518,680

CARRIER PHASE LOCK APPARATUS USING CORRELATION BETWEEN RECEIVED QUADRATURE PHASE COMPONENTS

Filed Oct. 2, 1967

INVENTOR.
GERALD K. McAULIFFE

BY Howard A. Silber

ATTORNEY

United States Patent Office 3,518,680

Patented June 30, 1970

3,518,680

CARRIER PHASE LOCK APPARATUS USING CORRELATION BETWEEN RECEIVED QUADRATURE PHASE COMPONENTS

Gerald K. McAuliffe, Orange, Calif., assignor to North American Rockwell Corporation Filed Oct. 2, 1967, Ser. No. 672,346
Int. Cl. H04b *1/12, 1/16*
U.S. Cl. 343—205 5 Claims

ABSTRACT OF THE DISCLOSURE

Apparatus for eliminating cross-channel interference in a quadrature transmission system having in-phase and quadrature detectors. Correlation means detects the degree of correlation between the output signals from the in-phase and quadrature detectors and provides in response thereto an error signal indicative of cross-channel interference. Phase control means, responsive to the error signal, shifts the phase of the reference phase signals to the detectors so as to cause the cross-channel interference, and hence the correlation between the detector output signals, to be minimized.

BACKGROUND OF THE INVENTION

Field of the invention

The invention relates to apparatus for eliminating cross-channel interference in a quadrature transmission system. More particularly, the invention relates to apparatus for eliminating cross-channel interference by detecting correlation between the detected in-phase and quadrature signals and, in response thereto, shifting the phase angle of a reference phase signal to the quadrature detector so as to minimize the correlation.

Description of the prior art

In the past, the performance of quadrature transmission systems has been limited by the occurrence of cross-channel interference caused by the nonsymmetrical characteristics of the transmission channels utilized. Such nonsymmetry is exhibited as a difference in gain or delay of the transmission channel at frequencies equally spaced above and below the center of the transmission channel pass band.

If a transmission channel were perfectly symmetric, then cross-channel interference in a quadrature transmission system can be eliminated by locking the frequency and phase of the reference signal supplied to the receiver demodulators to the frequency and phase of the oscillator output fed to the transmitter modulators, as shifted by the transfer characteristics of the transmission line. However, if the transmission channel is non-symmetric, such phase locking can only approach elimination of cross-channel interference; the further the channel deviates from perfect symmetry, the less the interference can be eliminated by phase locking.

Prior art approaches to elimination of cross-channel interference have primarily utilized phase lock techniques. For example, one prior art method used to obtain carrier phase lock involves the injection of a DC signal into one of the transmitter modulators to provide a sinusoidal pilot signal at the carrier frequency. At the receiver, a single phase lock loop locks a local oscillator, designed to operate at substantially the carrier frequency, to the phase and frequency of the pilot signal. The oscillator provides an output to a phase splitter which in turn supplies quadrature reference phase signals to the receiver detectors.

Another prior art method provides a double phase lock loop at the receiver end for detecting a pair of pilot signals inserted at the transmitter at the low and high ends of the transmission line pass band. This double phase lock loop is used to extract the carrier frequency and provide such frequency as an input signal to a phase shifter which also is responsive to the output of an integrator. The integrator is responsive to the presence on the quadrature output of a third pilot signal injected at the carrier frequency onto the in-phase channel. The integrator output provides a control signal to the phase shifter which tends to compensate for the phase shift of the carrier signal introduced by the transfer characteristics of the transmission line.

None of these prior art methods provide a carrier phase lock which eliminates cross-channel interference between the output signals of the receiver detectors as does the device of the present invention.

Since all of these prior art techniques utilize the phase lock, they are not capable of eliminating cross-channel intereference, in a quadrature transmission system, caused by utilization of a non-symmetric transmission line. In fact, no prior art technique have been reported to eliminate cross-channel interference due to transmission over a non-symmetric channel. It is this cross-channel interference which the present invention is design to eliminate.

SUMMARY OF THE INVENTION

In accordance with the present invention there is set forth an apparatus for elimination of cross-channel interference in a quadrature transmission channel. The present apparatus provides correlation means for detecting correlation between the in-phase and quadrature signals from the receiver demodulators. The correlation means provides an error signal the magnitude of which is indicative of the degree of cross-channel interference present.

The present apparatus also includes phase control means responsive to the error signal from the correlation means for generating a pair of reference phase signals which are coupled to the in-phase and quadrature demodulators. By shifting the phase of such signals by a controlled amount $\phi$ away from that phase provided by a standard phase lock system, cross-channel interference is eliminated at the data sampling time. In other words, a small, intentional, controlled deviation of the demodulator reference phase signal results in substantially perfect signal separation at the data sampling time.

An objective of the present invention is to provide an apparatus for eliminating cross-channel interference in a quadrature transmission system.

Another objective of the present invention is to provide cross-channel intereference apparatus utilizing correlation means.

A further object of this invention is to provide means for eliminating receiver cross-channel interference at specific data sampling times by controlled phase deviation from a perfect phase lock in a quadrature transmission channel.

Yet another object of the present invention is to provide, at the receiver of a quadrature transmission system, correlation means for detecting receiver cross-channel interference and phase control means which in response thereto shifts the phase of reference phase signals, whereby cross-channel interference is made substantially zero at the data sampling times.

DESCRIPTION OF THE PREFERRED EMBODIMENTS

Figure 1:
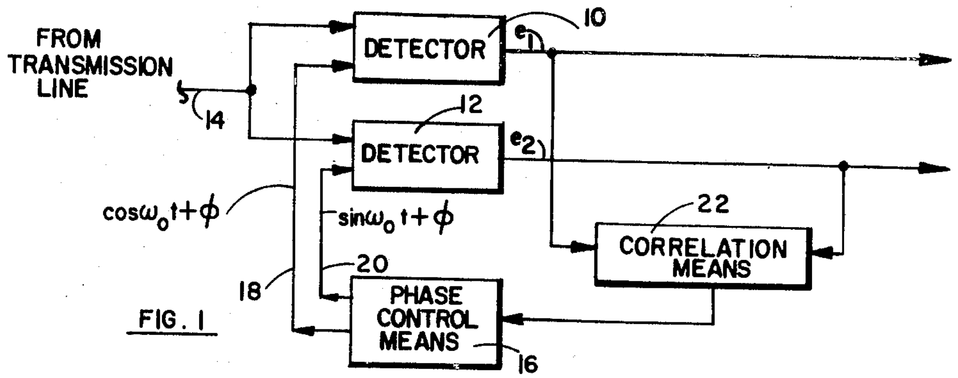
FIG. 1 shows a simplified block diagram of an apparatus, in accordance with the present invention, for eliminating cross-channel interference in a quadrature transmission system.

Referring to FIG. 1, there is shown the receiver portion of a quadrature transmission system employing an apparatus in accordance with the present invention for providing carrier phase lock using correlation between in-phase and quadrature signals. As shown, the invention is used in conjunction with in-phase detector 10 and a quadrature detector 12 which detectors separate information signals transmitted over transmission line 14 on quadrature phases of a carrier signal. Detectors 10 and 12 each are of a type well known to those skilled in the communications art, and are described, e.g., in the text "Data Transmission" by William R. Bennett and James R. Davey, McGraw-Hill Book Company, 1965, at pages 102–103.

The quadrature transmission system receiver shown in FIG. 1 recovers the two independent information signals (hereinbelow referred to as data input signals $d_1$ and $d_2$) from the carrier; these signals are designated $e_1$ and $e_2$ at the output respectively of detectors 10 and 12. Due to the phase distortion characteristics of transmission line 14, detector 10 detects to some degree the signal which normally should appear exclusively at the output of detector 12, and vice versa. That is to say, the signal $e_1$, which should only contain data $d_1$, will contain some components of input data signal $d_2$. Similarly, output signal $e_2$, which should only contain data $d_2$, will contain some components of input data signal $d_1$. This cross-channel interference, caused by the distortion characteristics of transmission line 14, will result in some correlation between signals $e_1$ and $e_2$.

Referring still to FIG. 1, correlation means 22 is coupled to the outputs of detector 10 and detector 12. Means 22 operates upon the detector outputs to provide an error signal the magnitude of which is indicative of the degree of correlation (i.e., of cross-channel interference) between output signals $e_1$ and $e_2$ of detectors 10 and 12. Also shown in FIG. 1 is phase control means 16 which provides a pair of reference phase signals. These signals, which are in quadrature with respect to each other are coupled by means of lines 18 and 20 respectively to the inputs of the detectors 10 and 12.

The error signal generated by correlation means 22 is provided as an input to phase control means 16. In response to this error signal, means 16 shifts to the same degree the phase of both reference phase signals provided on lines 18 and 20 to the inputs of detectors 10 and 12. As the reference phase signals are shifted by an angular amount $\phi$, the cross-channel interference between the output signals $e_1$ and $e_2$ decreases until correlation means 22 generates substantially an error signal indicative of substantially zero correlation. A mathematical explanation showing that a shift of the reference phase signals by an angular amount $\phi$ will substantially eliminate cross-channel interference between the two recovered signals $e_1$ and $e_2$ is presented hereinbelow. (Of course, the cross-channel interference is eliminated only at the data sample times.)

Figure 2:
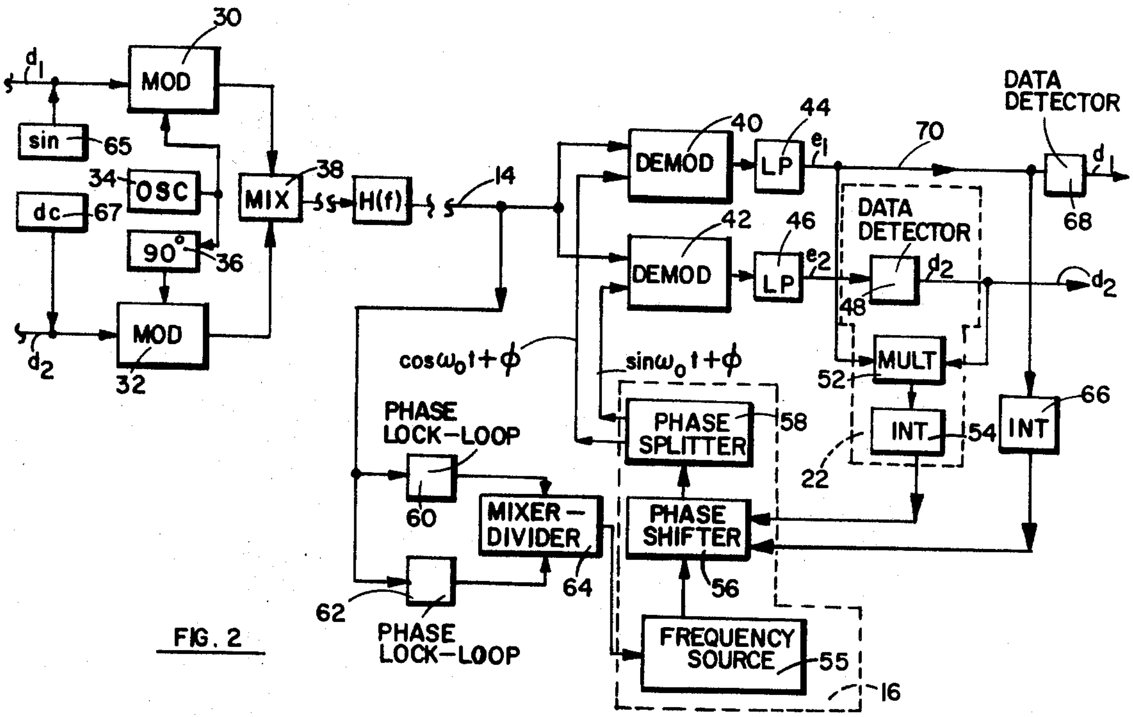
FIG. 2 shows a quadrature transmission system incorporating a preferred embodiment of the present invention.

A more detailed block diagram of the inventive carrier phase lock apparatus using correlation is illustrated in FIG. 2. Referring to FIG. 2, there is shown a pair of input signals, $d_1$ and $d_2$ to a quadrature transmission system transmitter. Signals $d_1$ and $d_2$ are independent, randomized, digital information signals which are processed respectively by modulators 30 and 32. A carrier frequency is generated by oscillator 34; this carrier is connected directly to modulator 30 and through 90° phase shifter 36 to modulator 32. The outputs of modulators 30 and 32 are combined in mixer 38 for transmission along transmission line 14, the transfer characteristics of which are indicated by the transfer block $H(f)$. Such a quadrature transmitter, as herein shown, is well known in the art, as typified by the text of Bennett et al., op. cit., page 102.

At the receiver, a pair of demodulators 40 and 42 (see FIG. 2) separate the transmitted signal into two independent information signals, which are then passed through low pass filters 44 and 46 to provide recovered signals $e_1$ and $e_2$. Data detector 48, shown here inserted in the output line from filter 46, transforms the analog signal $e_2$ into a digital data signal $d_2$ corresponding substantially to the input data signal $d_2$ to modulator 32. Similarly data detector 68, inserted in output line 70, converts analog signal $e_1$ into a digital signal $d_1$ substantially corresponding to input data signal $d_1$ to modulator 30.

In the embodiment illustrated in FIG. 2, correlation means 22 comprises data detector 48, multiplier 52 and integrator 54. As indicated above, output $d_2$ of data detector 48 is a digital signal, while output $e_1$ of low pass filter 44 is an analog signal. Multiplier 52 functions to provide a product output having an amplitude equal t that of signal $e_1$. The sign of the product output of multiplier 52 is the same as the sign of $e_1$ if $d_2$ is a binary 1, but has a sign opposite that of $e_1$ if $d_2$ is a binary 0.

Integrator 54 (see FIG. 2) integrates over time the product output of multiplier 52. The output of integrator 54 is an error signal the magnitude of which is indicative of the degree of correlation between signals $e_1$ and $e_2$. Typical circuitry to perform the function of multiplier 52 and integrator 54 is shown in the co-pending application to McAuliffe et al., Ser. No. 643,517 owned by North American Rockwell Corporation, owner of the present application.

Referring still to FIG. 2, note that in the embodiment shown phase control means 16 comprises frequency source 55, phase shifter 56, and phase splitter 58. Frequency source 55 provides a reference signal at a frequency $\omega_0$ corresponding to the carrier frequency of oscillator 34 as shifted due to the distortion of transmission line 14. The reference signal from frequency source 55 is fed to phase shifter 56.

Phase shifter 56 (see FIG. 2) alters the phase of the reference signal from frequency source 55 by an angular amount $\phi$ in response to the error signal from correlation means 22. The phase shifted reference signal from phase shifter 56 is split into quadrature components by phase splitter 58. The reference phase signals from phase splitter 58 are shown in FIG. 2 as $\cos \omega_0 t+\phi$ and $\sin \omega_0 t+\phi$ and are coupled to the input terminals respectively of demodulator 40 and demodulator 42.

The embodiment of the inventive carrier phase lock apparatus illustrated in FIG. 2 includes circuitry (including DC signal source 67 and integrator 66) to provide an initial coarse adjustment of the phase angle $\phi$ to a value at which substantial cross-channel interference is eliminated. Such initial coarse adjustment is desirable, since in a preferred embodiment the time constant of integrator 54 is much longer than the bit rate of the data being transmitted. This means that there will be some time lag between the start of data transmission and the time at which the output of integrator 54 accurately represents the degree of correlation between signals $e_1$ and $e_2$.

To effect initial coarse phase adjustment of the reference signal from frequency source 55, a first pilot tone at the carrier frequency is transmitted over transmission line 14. This first pilot tone is generated by injecting a DC signal into modulator 32 from DC signal source 67 (see FIG. 2). In the absence of any correlation between output signals $e_1$ and $e_2$, this first pilot tone will be present only in output signal $e_2$. Imperfect integrator 66, coupled to the output of low pass filter 44, is responsive to any component of the first pilot tone which may be present in output signal $e_1$ as a result of cross-channel interference. Integrator 66 integrates this component to produce an error output, indicative of the cross-channel interference, to phase shifter 56. Since the time constant of integrator 66 need only correspond to several cycles at the third pilot tone frequency, a useful output from integrator 66 is obtained very rapidly after start of data ransmission. Once integrator 54 begins to produce an accurate error signal, the output of integrator 54 predominates over the signal from integrator 66 in the control of phase shifter 56. Of course, a much finer control of the phase angle $\phi$ is obtained when phase shifter 56 responds to the output of integrator 54. In order to assure that the frequency of the reference signal from frequency source 55 corresponds to the carrier frequency of oscillator 34 as shifted by transmission line 14, a locking circuit is provided which comprises signal source 65, phase lock loops 60 and 62, and mixer-divider 64 (see FIG. 2). Sinusoidal signal source 65 is shown at the transmitter connected to modulator 30. The effect of signal source 65 is to provide at the output of mixer 38 second and third pilot tones respectively at the upper and lower frequencies of the transmission line pass band. Phase lock loops 60 and 62 are connected to transmission line 14 on the receiver side and detect the frequencies of the second and third pilot tones. Phase lock loops 62 and 60 each comprise a phase detector, a loop filter, and a voltage controlled oscillator, the frequency of which is set to operate at substantially the intended frequency of either the second or third pilot tones. Loop 60 then locks to one of these tones and loop 62 locks to the other. For reference to a more detailed discussion of the circuit described herein as a phase lock loop, see the textbook "Phaselock Techniques," by Floyd M. Gardner, published by John Wiley and Sons, Inc., 1966.

The output signals of phase lock loops 60 and 62 (see FIG. 2) are combined in mixer-divider 64, which performs a sum and difference operation and a division by two, resulting in an output signal corresponding to the carrier frequency from oscillator 34 as shifted by the transmission line transfer characteristics H($f$). This output signal from mixer-divider 64 then may be used to lock frequency source 55 to the shifted frequency and phase of the carrier originally generated by oscillator 34. This locking may be accomplished by means of the circuitry shown in FIG. 3.

Figure 3:
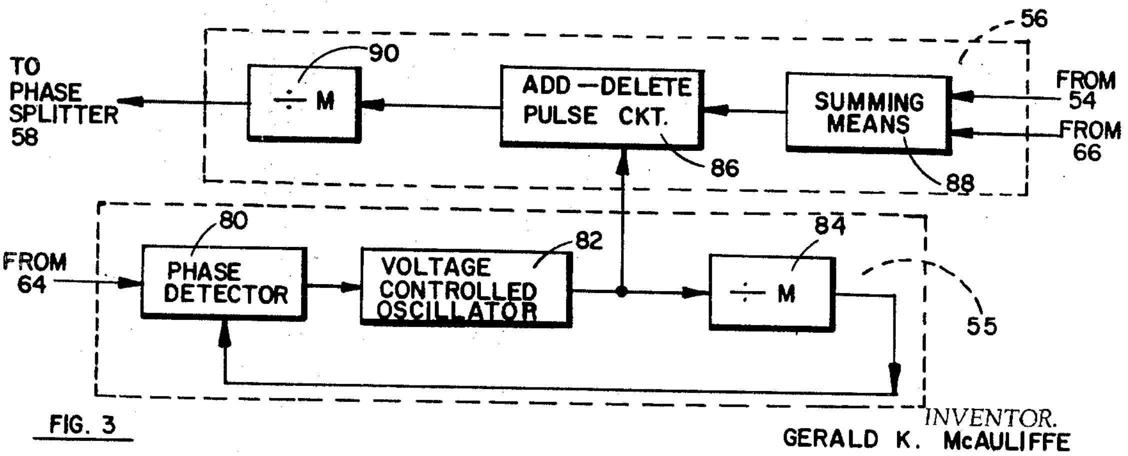
FIG. 3 shows in more detail the elements comprising the Phase Shifter and Frequency Source shown in FIG. 2.

Referring to FIG. 3, frequency source 55 and phase shifter 56 are depicted in more detailed block diagram form. In particular, there is provided voltage controlled oscillator 82 which operates at a multiple $m$ of the desired reference frequency $\omega_o$. Dividing circuit 84 divides by $m$ the output of the oscillator 82, and provides an output at the derived frequency to phase detector 80. Phase detector 80 compares the phase of the derived frequency from divider $m$ with the shifted oscillator frequency recovered by mixer-divider 64, and produces an output voltage indicative of the difference in phase. This output voltage is fed to oscillator 82 where it causes oscillator 82 to shift in frequency until the phase difference sensed by detector 80 is minimized. As a result, oscillator 82 becomes locked both in phase, and as a result also in frequency, to the frequency $m\omega_o$, where $\omega_o$ is the desired reference frequency corresponding to the frequency of oscillator 34 as shifted by transmission line 14.

The output of oscillator 82 also is coupled to an add-delete pulse circuit 86. Circuit 86 also receives an input control voltage from summing means 88. Means 88 adds the error signals generated by correlation means 22 and the imperfect integrator 66 (see FIG. 2). In response to the combined outputs from integrators 54 and 66, circuit 86 either adds or deletes a pulse or pulses to or from the reference phase signal from oscillator 82, thereby effectively altering the phase of the reference signal. The output of circuit 86 is divided by $m$ in dividing circuit 90, to provide a reference signal at frequency $\omega_o$ but with its phase shifted by an amount $\phi$; this signal is coupled to phase splitter 56 shown in FIG. 2.

A summary of a mathematical analysis of what occurs to input data signals $d_1$ and $d_2$ and to output signals $e_1$ and $e_2$ will explain why a phase shift of the reference signal from frequency source 55 can eliminate cross-channel interference between signals $e_1$ and $e_2$ at data sample times. As noted earlier, input data signals $d_1$ and $d_2$ form the inputs to modulators 30 and 32 respectively, while recovered signals $e_1$ and $e_2$ appear at the outputs of filters 44 and 46. The Fourier transforms $E_1$ and $E_2$ of the recovered signals $e_1$ and $e_2$ are as follows:

$$E_1(f)=\tfrac{1}{4}D_1(f)[\Sigma\cdot\cos\phi+j\Delta\cdot\sin\phi]-\tfrac{1}{4}D_2(f)[\Sigma\cdot\sin\phi-j\Delta\cdot\cos\phi] \quad (1)$$

$$E_2(f)=\tfrac{1}{4}D_1(f)[\Sigma\cdot\sin\phi-j\Delta\cdot\cos\phi]+\tfrac{1}{4}D_2(f)[\Sigma\cdot\cos\phi+j\Delta\cdot\sin\phi] \quad (2)$$

where:

H($f$)=the transfer function of the transmission channel or line, $$\Sigma=H(f-f)+H(f+f_o) \quad (3)$$

$$\Delta=H(f-f_o)-H(f+f_o) \quad (4)$$

$\phi$=the receiver phase error, $$D_1(f)=F[d_1(t)] \text{ (Fourier transform)} \quad (5)$$

$$D_2(f)=F[d_2(t)] \quad (6)$$

It should be noted that $\Delta$, which is a function of frequency, expresses the asymmetry of the transmission channel about the carrier frequency. If the channel is symmetric, $\Delta=0$; and if $\phi=0$ perfect separation of $d_1$ and $d_2$ would be obtained, with the result that:

$$E_1(f)=\Sigma\cdot D_1(f) \quad (7)$$

$$E_2(f)=\Sigma\cdot D_2(f) \quad (8)$$

In this case, the in-phase data stream produces no interference in the quadrature channel, and vice versa.

In general $\Delta$ is not zero. Thus the in-phase data channel signal $d_1(t)$ will introduce interference, or cross-talk into the quadrature channel signal $d_2(t)$, and vice versa.

By letting $$F^{-1}(\Sigma)=\sigma(t) \text{ (inverse Fourier transform)} \quad (9)$$

$$F^{-1}(\Delta)=\sigma(t) \quad (10)$$

the following expressions (11) and (12) result, which are the inverse Fourier transformations of Equations 1 and 2. Expressions (11) and (12) are the actual time functions $e_1(t)$ and $e_2(t)$ resulting from the transmission line distortion and a phase error $\phi$ in the reference signals fed to demodulators 40 and 42.

$$e_1(t)=\tfrac{1}{4}d_1(t)*[\sigma(t)\cos\phi+\delta(t)\sin\phi]-\tfrac{1}{4}d_2(t)*[\sigma(t)\cos\phi+\delta(t)\sin\phi] \quad (11)$$

$$e_2(t)=\tfrac{1}{4}d_1(t)*[\sigma(t)\sin\phi-\delta(t)\cos\phi]+\tfrac{1}{4}d_2(t)*[\sigma(t)\cos\phi+\delta(t)\sin\phi] \quad (12)$$

Notice from Equations 11 and 12 that the interference of $d_2(t)$ in the signal $e_1(t)$, and that of $d_1(t)$ in signal $e_2(t)$ are both a function of the same expression, namely $[\sigma(t)\sin\phi-\delta(t)\cos\phi]$. By causing this expression to become zero at the data sampling time ($t_1$), the cross-channel interference is eliminated at that time.

By setting $$\sigma(t_1)\sin\phi=\delta(t_1)\cos\phi \quad (13)$$

then $$\tan\phi=\frac{\delta(t_1)}{\sigma(t_1)} \quad (14)$$

or $$\phi=\tan^{-1}\frac{\delta(t_1)}{\sigma(t_1)} \quad (15)$$

Therefore $$e_1(t_1)=C(t_1)d_1(t_1) \quad (16)$$

$$e_2(t_1)=C(t_1)d_2(t_1) \quad (17)$$

where $C(t_1)$ is a constant at time $(t_1)$. Thus there is no cross-channel interference at $t=t_1$, where $t_1$ is the data sampling time, usually about the peak of impulse response of the in-phase channel.

A further explanation of the correlation detection provided by the present invention now is given with attention called to Equation 11 above. To detect the presence of cross-channel interference, correlation means 22, shown in FIGS. 1 and 2, operates upon output signals $e_1$ and $e_2$. First, input data $d_2$ is recovered from signal $e_2$ through use of data detector 48. The signals $e_1$ and $d_2$ are then multiplied by multiplier 52, as hereinbefore described, and the output product signal is integrated by integrator 54. When the expression $[\sigma(t) \sin \phi - \delta(t) \cos \phi]$ in Equation 11 is not zero, the product output signal from the multiplier will not be zero, but will contain a term proportional to $d_2^2$. When the expression is zero, the integrator 54 output will be zero because there is no correlation between randomized signals $d_1$ and $d_2$.

It is neither possible nor necessary that $$[\sigma(t) \sin \phi - \delta(t) \cos \phi]$$

be made zero at all times. But at the data sampling time $(t_1)$, which occurs at a rate equal to the band rate of signals $d_1$ and $d_2$, the expression $$[\sigma(t) \sin \phi + \delta(t) \cos \phi]$$

is made to equal zero. In other words, at the time the data is sampled there is no cross-channel interference. Data detector 48 operates at the data sampling rate to sample signal $e_2$. It should be noted that detector 68 also operates at the data sampling rate to sample the signal $e_1$ and provides an output signal substantially equal to signal $d_1$.

Although the invention has been described in detail, it is to be understood that the same is by way of illustration and example only, and is not to be taken by way of limitation, the spirit and scope of this invention being limited only by the terms of the appended claims.

I claim:

1. In a quadrature transmission system having first and second detectors for detecting two independent, randomized, information signals modulating quadrature phases of a carrier, said detectors utilizing first and second reference phase signals respectively, apparatus for eliminating cross-channel interference comprising:

correlation means for detecting correlation between outputs from said first and second detectors and for providing an error signal indicative of said correlation, said correlation means comprising:

data detector means responsive to one of said outputs for recovering one of said information signals;

multiplier means responsive to the other of said outputs and to said recovered information signal for generating a product output signal;

integrator means for integrating said product output signal, thereby providing an error signal indicative of correlation between said outputs; and phase control means for shifting the phase of said reference phase signals in response to said error signal until said correlation is minimized.

2. The device of claim 1 wherein said phase control comprises, frequency source for providing an output signal having substantially the frequency of said carrier, phase shifter means for shifting the phase of said output signal from said frequency source in response to said error signal, and phase splitter means for splitting said reference phase signal thereby providing said first and second reference phase signals.

3. The device of claim 2 further comprising means for phase locking said frequency source to the frequency and phase of said carrier.

4. The device of claim 3 further comprising, means for inserting a pilot tone on one phase of said carrier, and integrating means responsive to the presence of said pilot tone on the other phase of said carrier, said means providing an error signal indicative of said presence to said phase shifter means.

5. In a quadrature transmission system having first and second detectors for detecting two independent, randomized, information signals modulating quadrature phases of a carrier, said detectors utilizing first and second reference phase signals respectively, apparatus for eliminating cross-channel interference comprising, data detector means responsive to one of said outputs for recovering one of said information signals, multiplier means responsive to the other of said outputs and to said recovered information signal for generating a product output signal, integrator means for integrating said product output signal, thereby providing an error signal indicative of correlation between said outputs, frequency source for providing an output signal having substantially the frequency of said carrier, phase shifter means for shifting the phase of said output signal from said frequency source in response to said error signal, and phase splitter means for splitting said reference phase signal, thereby providing said first and second reference phase signals.

References Cited

UNITED STATES PATENTS

| | | | |
|---|---|---|---|
| 3,031,529 | 4/1962 | Colodny. | |
| 3,289,082 | 11/1966 | Shumate | 325—60 |
| 3,384,824 | 5/1968 | Grenier. | |
| 3,447,085 | 5/1969 | Haas et al. | 325—60 |

RICHARD MURRAY, Primary Examiner

J. A. BRODSKY, Assistant Examiner

U.S. Cl. X.R.

178—88; 179—15; 325—60, 423, 472, 476